(12) United States Patent
Corlett et al.

(10) Patent No.: US 6,253,192 B1
(45) Date of Patent: Jun. 26, 2001

(54) METHOD OF PERSONAL FINANCIAL PLANNING

(75) Inventors: John Broughton Corlett, Sandton; Peter Garth Corlett, Midrand; Johann Wilhelm Maree, Randburg; Basil Hugh MacDougall, Walkers Fruit Farm, all of (ZA)

(73) Assignee: The Quantam Consultancy Group (Proprietary) Limited, Sandown (ZA)

( * ) Notice: Subject to any disclaimer, the term of this patent is extended or adjusted under 35 U.S.C. 154(b) by 0 days.

(21) Appl. No.: 09/147,752

(22) PCT Filed: Sep. 2, 1997

(86) PCT No.: PCT/US97/15358

§ 371 Date: Jun. 4, 1999

§ 102(e) Date: Jun. 4, 1999

(87) PCT Pub. No.: WO98/14902

PCT Pub. Date: Apr. 9, 1998

(30) Foreign Application Priority Data

Aug. 30, 1996 (ZA) .................................................. 96/7373

(51) Int. Cl.[7] ...................................................... G06F 17/60
(52) U.S. Cl. ............................................... 705/36; 705/35
(58) Field of Search ............................................ 705/35, 36

(56) References Cited

U.S. PATENT DOCUMENTS

| 4,953,085 | 8/1990 | Atkins | 364/408 |
|---|---|---|---|
| 4,969,094 | 11/1990 | Halley et al. | 364/408 |
| 5,148,365 | 9/1992 | Dembo | 364/402 |
| 5,613,072 | * 3/1997 | Hammond et al. | 705/4 |
| 5,774,881 | * 6/1998 | Friend et al. | 705/36 |
| 5,784,696 | * 7/1998 | Melnikoff | 705/36 |

FOREIGN PATENT DOCUMENTS

WO 98/14902 * 4/1998 (WO) .

OTHER PUBLICATIONS

Moen: "The priority pyramid", Jan.–Feb. 1997 Saakatchenwan Business, v18, n1, p. 12.*

* cited by examiner

Primary Examiner—Edward R. Cosimano
(74) Attorney, Agent, or Firm—Jacobson, Price, Holman & Stern, PLLC (57) ABSTRACT

A method of financial planning in which a financial model is created from data relating to a subject's income, expenses, assets and liabilities. A planning rules database is created from data relating to a preferred financial strategy. First, an unplanned future financial situation of the subject is projected by applying predicted circumstances to the data of the financial model. Then, planning rules selected from the database are applied to the unplanned future financial situation to calculate a planned future financial situation, and the resulting data is displayed for comparison. An allocation and funding routine applies to the selected planning rules automatically, but the method also permits iterative alteration of the planned future financial situation, to permit the subject to see the effect of particular events on the situation.

13 Claims, 7 Drawing Sheets

METHOD OF PERSONAL FINANCIAL PLANNING

BACKGROUND OF THE INVENTION

THIS invention relates to a method of personal financial planning.

Current methods of financial and retirement planning commonly take into account a subject's assets, liabilities, income and expenditure in order to establish the subject's current financial position. An attempt is then made to project the subject's future financial requirements, and if sufficient capital is not available to accommodate these requirements, suggestions are made as to how the necessary capital can be provided.

There are, however, a multiplicity of variables which influence such projections, including variations in the inflation rate, applicable tax rates, and variations in income and expenditure, inter alia, as well as the great number of possible choices which the subject can make in terms of his or her lifestyle and likely future expenses (for example, the purchase of a holiday home or a new vehicle). If an attempt is made to take all of these variables into account, the projection quickly becomes unwieldy, and conventional approaches therefore tend to rely on a simplified, broad-based approach.

It is an object of the invention to provide a method of financial planning which can give a subject a relatively detailed and in-depth assessment of his or her financial future, and which allows the effect of various alternatives to be considered.

SUMMARY OF THE INVENTION

According to the invention there is provided a method of financial planning, the method comprising:

creating a financial model from data relating to income, expenses, assets and liabilities of a subject;

creating a planning rules database from data relating to a preferred financial strategy of the subject;

projecting an unplanned future financial situation of the subject by applying predicted future circumstances to the data of the financial model;

applying a plurality of planning rules derived from the planning rules database to data representing the subject's unplanned future financial situation, thereby to calculate a planned future financial situation; and generating displays of data representing the planned and unplanned future financial situations for comparison.

For purposes of projecting the subject's future financial situation, the financial model may further be compiled from data relating to applicable tax rates, estate duty rates, annual inflation rates, rates of appreciation or depreciation/increase or decrease of assets, liabilities, income and expenditure, and predicted future values thereof.

The financial model may additionally include data relating to costs associated with the management of assets and liabilities, such as commissions, finance charges, administration fees, transfer costs and the like.

The financial model may further include the subject's actual or anticipated retirement date, and estimated date of death.

In addition, the financial model may include similar information for the subject's spouse, family trusts or any other person or entity who should be considered when planning the subject's finances.

The planning rules database may be compiled by recording data corresponding to the subject's preferences relating to the investment of cash surpluses and the funding of cash deficits.

The planning rules database may further include data relating to predicted future income and expenses of the subject.

Preferably, the data relates to priorities set by the subject for allocating cash surpluses to liquidate debts or fund investments, and liquidating assets or increasing liabilities to fund cash deficits.

The planning rules derived from the planning rules database are preferably applied automatically to the data representing the client's unplanned future financial situation by an allocation and funding routine, thereby to generate a suggested future financial situation usable in calculating the subject's planned future financial situation.

The method may include, on an iterative basis, selectively altering data representing the subject's planned future financial situation and recalculating the planned future financial situation by applying the planning rules to the altered data.

The method is preferably carried out using a computer which generates the financial model and the planning rules database and applies the planning rules automatically to the relevant data after entry of the data.

DESCRIPTION OF AN EMBODIMENT

The present invention revolves around a software program designed to facilitate the entry of detailed financial data relating to a subject's current and future financial situation, to generate a detailed financial model from the data, using data corresponding to predicted future circumstances and assumptions, and especially to allow the model to be altered and developed using rules and preferences set by the subject, thus allowing a detailed projection of the subject's future financial situation which takes both external factors and the subject's own personal choices into account. In particular, the method allows probable future annual cash flow surpluses and shortfalls to be identified, and automatically applies the rules and preferences set by the subject to invest the surpluses and to fund the deficits. The result is a suggested model representing a planned future financial situation of the subject, which can be analyzed and adjusted as required until a satisfactory financial plan results. The software generates displays allowing the calculated data to be viewed in a user friendly manner, and generates printouts as a record of its operation.

Figure 1A:
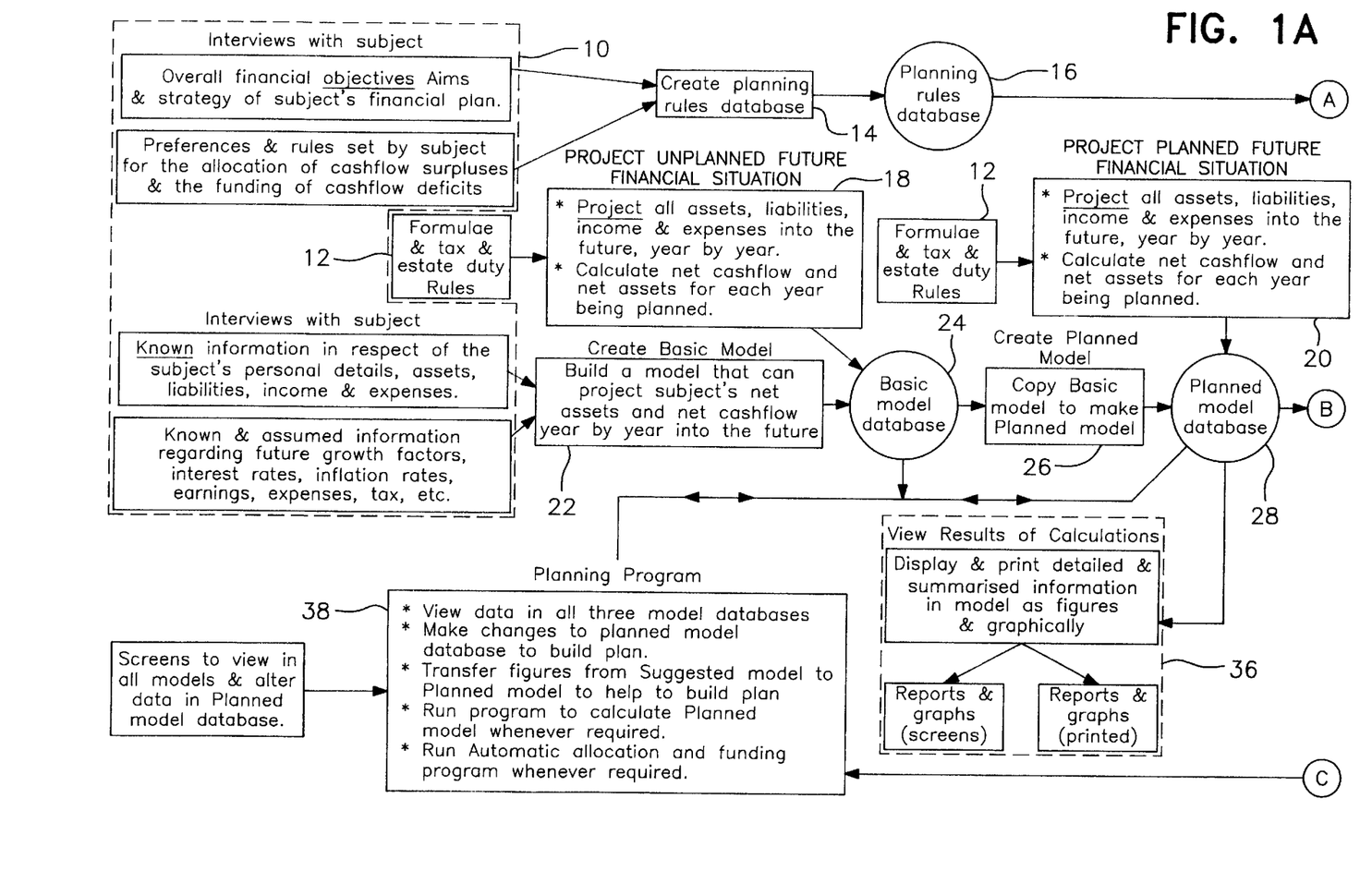
FIGS. 1A & 1B is a simplified overall flow diagram illustrating the method of the invention.
Figure 1B:
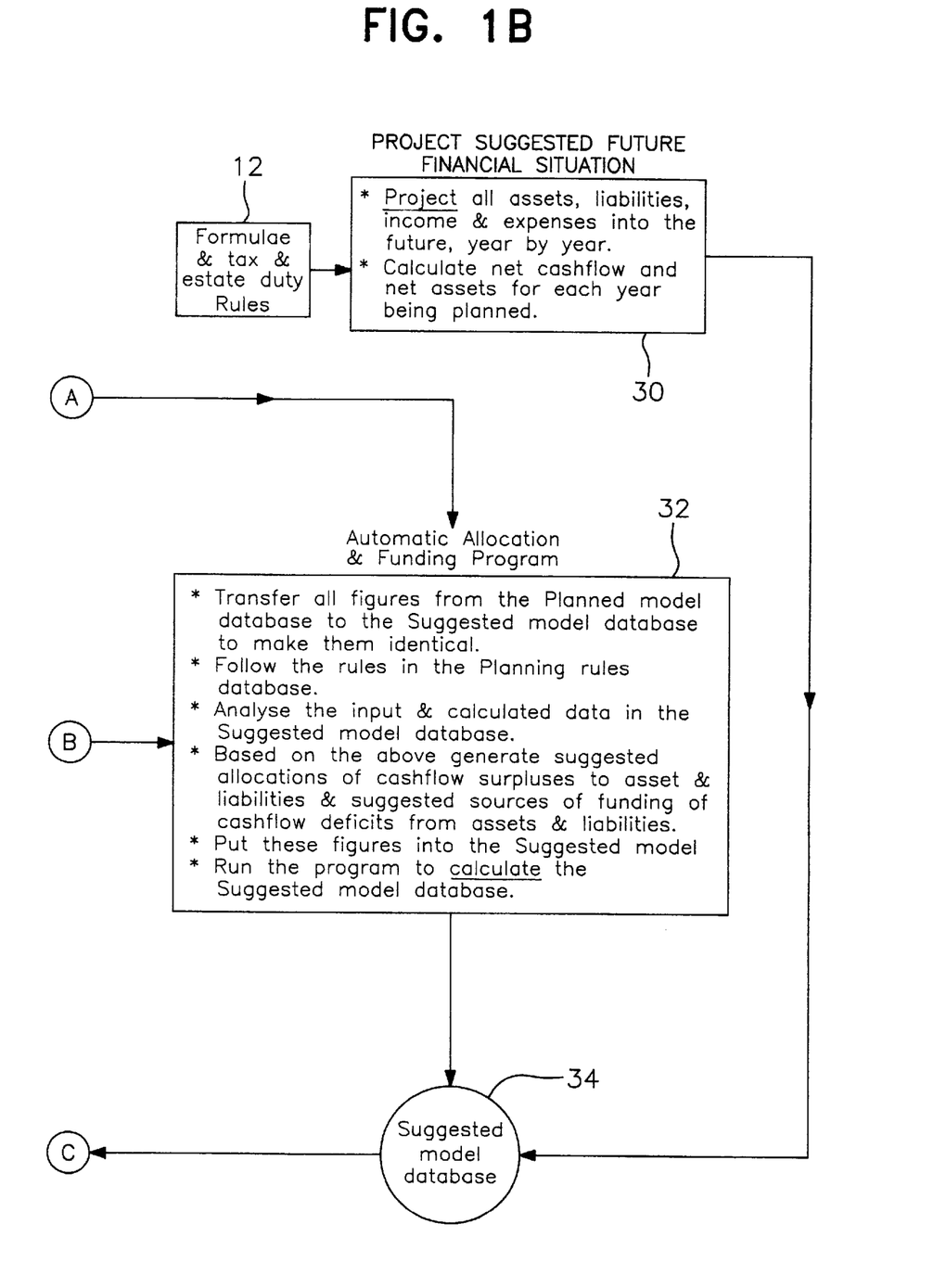
Figure 2:
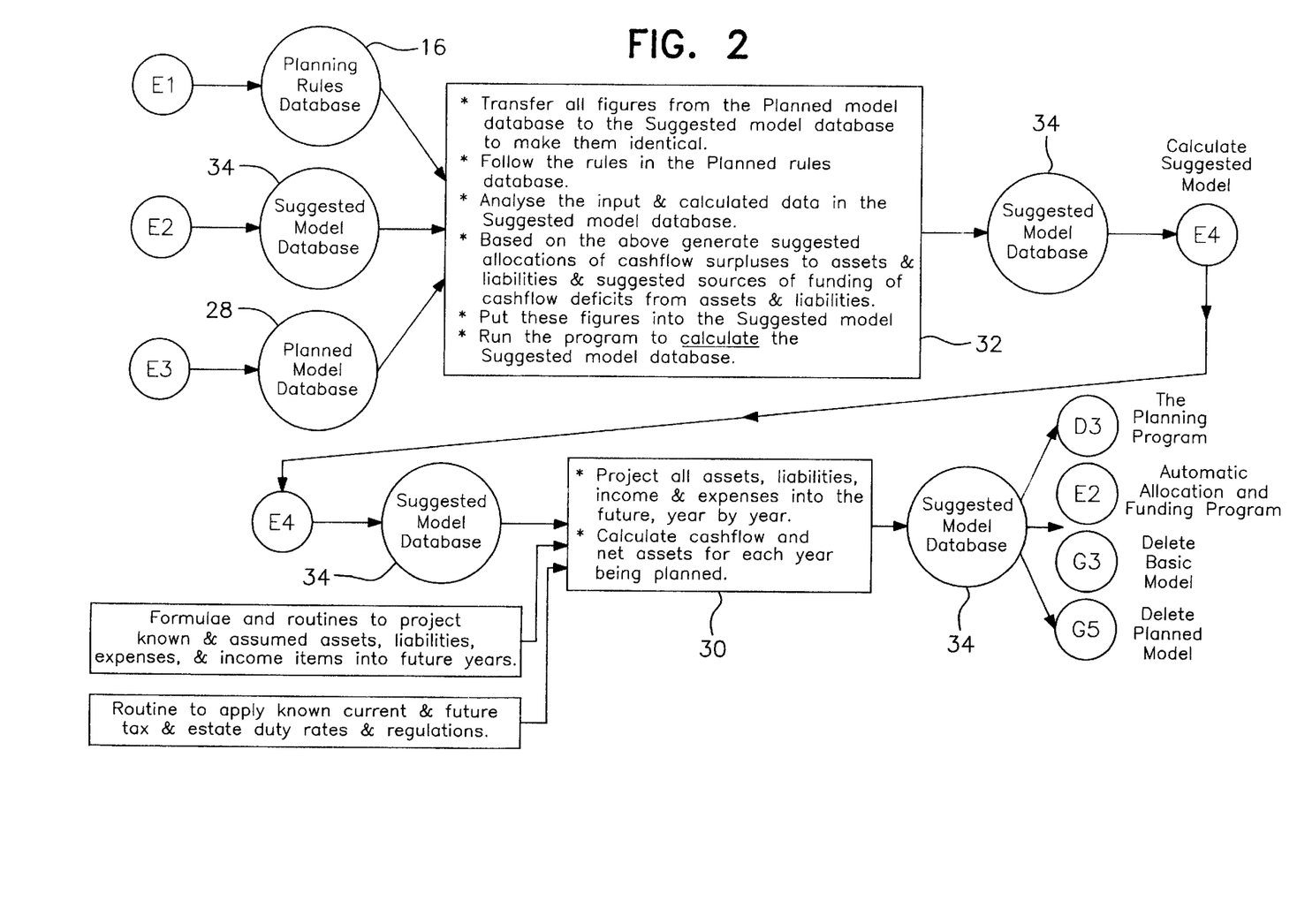
FIG. 2 is a simplified block diagram illustrating the operation of an automatic funding and allocation program used to implement the method, and the subsequent calculation of a suggested financial model.

The overall operation of the method of the invention, as implemented using a purpose-written software program, typically running on a personal computer (PC), is shown in FIG. 1. Operation of the automatic allocation and funding program for calculation of a suggested financial model is shown in FIG. 2.

The method will typically be carried out by a financial advisor who interviews and advises the subject whose financial situation is under analysis, although it will be appreciated that the subject could operate the software directly.

Assuming the first mentioned scenario, the first step in the method is for the financial advisor to interview the subject 10, and to obtain two types of information; firstly, actual financial information in respect of the subject's personal details, assets, liabilities, income and expenses and so on; and secondly, the subject's overall financial objectives and strategy, from which the subject's preferences and rules for the allocation of cashflow surpluses and the funding of cashflow deficits can be determined.

The first category of information is utilised to create a basic financial model 22 which contains sufficient information to project the subject's net assets and nett cashflow year-by-year into the future, using conventional assumptions, and applying known tax and estate duty rules and rates 12, thereby to project an unplanned future financial situation 18 of the subject.

The basic financial model 22 with database 24 is copied to provide the starting point for a planned model 26 with database 28, which is altered and updated interactively by the user, utilizing data generated by an automatic allocation and funding routine 32 of the software, until the planned future financial situation 20 of the subject is considered satisfactory. Thus, the planned model 26, 28 starts out as a copy of the basic model 22, 24, and the suggested model and database 34 is initially a copy of the planned model. The difference is that the basic or unplanned model 24 is left unaltered, while the suggested model 34 is acted on by the automatic allocation and funding program 32, with a projected suggested future financial situation 30 and the planned model is updated and altered in the light of the results thereof, as well as further choices of the subject. Calculation results may be viewed 36 by printing or on-screen display.

The following description relates to all three models, since their structure is essentially the same. The model comprises the following:

(a) one entry for each of the subject's current and anticipated future assets;

(b) one entry for each of the subject's current and anticipated future liabilities;

(c) one entry for each of the subject's current and anticipated future sources of income; and (d) one entry for each of the subject's current and anticipated future expenses.

These entries are grouped into various sections and each section has a section heading. There are also totalled entries within the model. Some of these are section totals, while others are calculated by applying formulae to the figures on other entries or combinations of entries. Appendix 1 gives an example of sections and the types of entries that may appear in those sections, under the main heading "Known Cash Inflows". The studying and auditing of the model is facilitated by the grouping of similar items together.

The extent and level at which information is fed into the model depends upon the degree of detail required by the subject for whom the model is being built, but will typically include the following:

(a) current and future income and expenses;

(b) current and future assets and liabilities;

(c) current and future assumptions relating to growth rates, interest rates, dividend rates, etc.;

(d) known or anticipated retirement date; and (e) estimated date of death.

It can be seen that the model is custom-built for each subject as the database of the model is being compiled, and a formula is associated with each entry as it is loaded. The particular formula applied to any entry is dependent on the type of entry.

The programs to calculate the three different types of models all function in exactly the same way.

The calculation program reads through the model database and on each entry, performs calculations according to the formula associated with the item.

Figure 3:
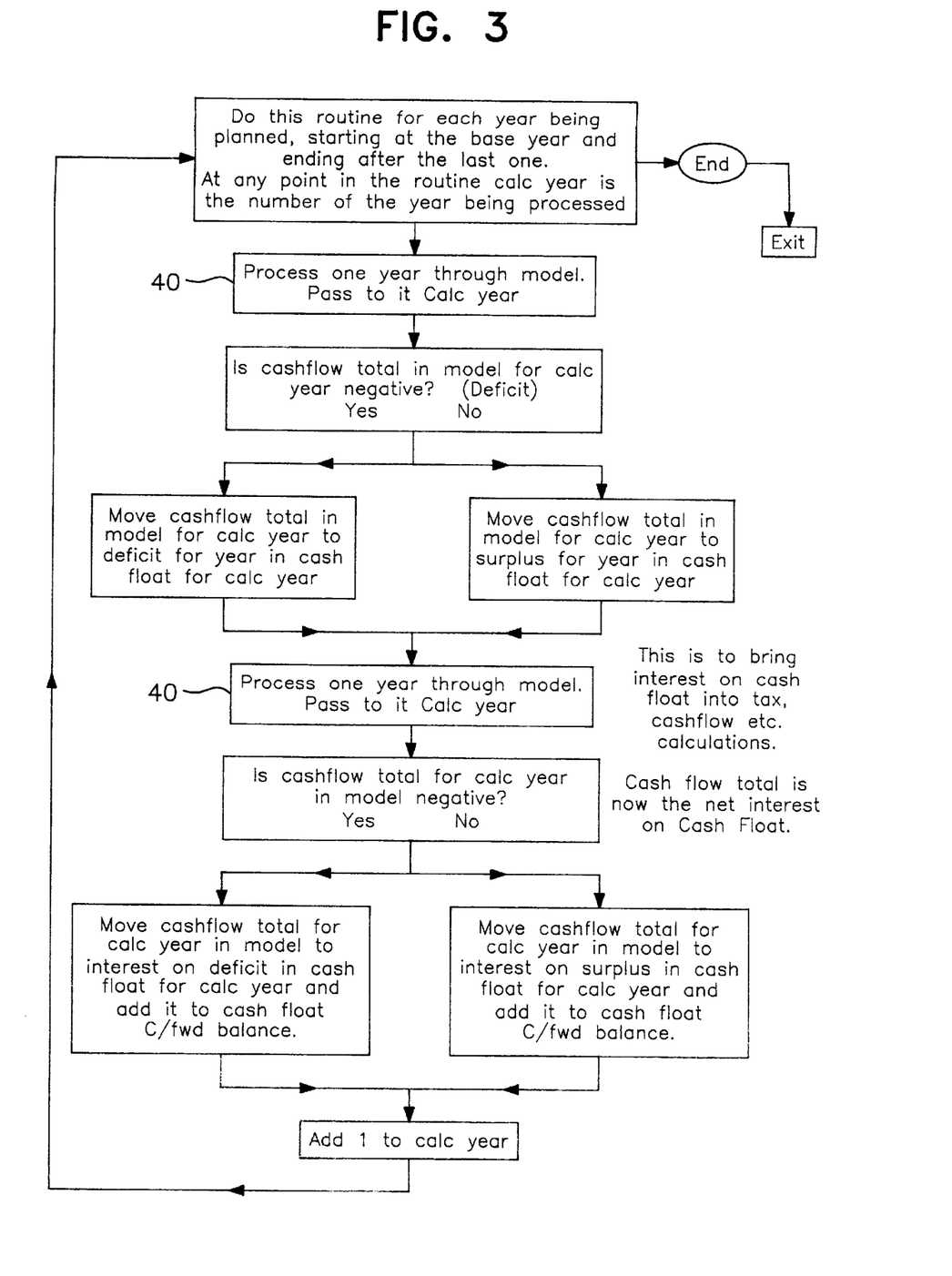
FIG. 3 is a simplified flowchart illustrating the method of calculating a financial model utilising the method of the invention.
Figure 4:
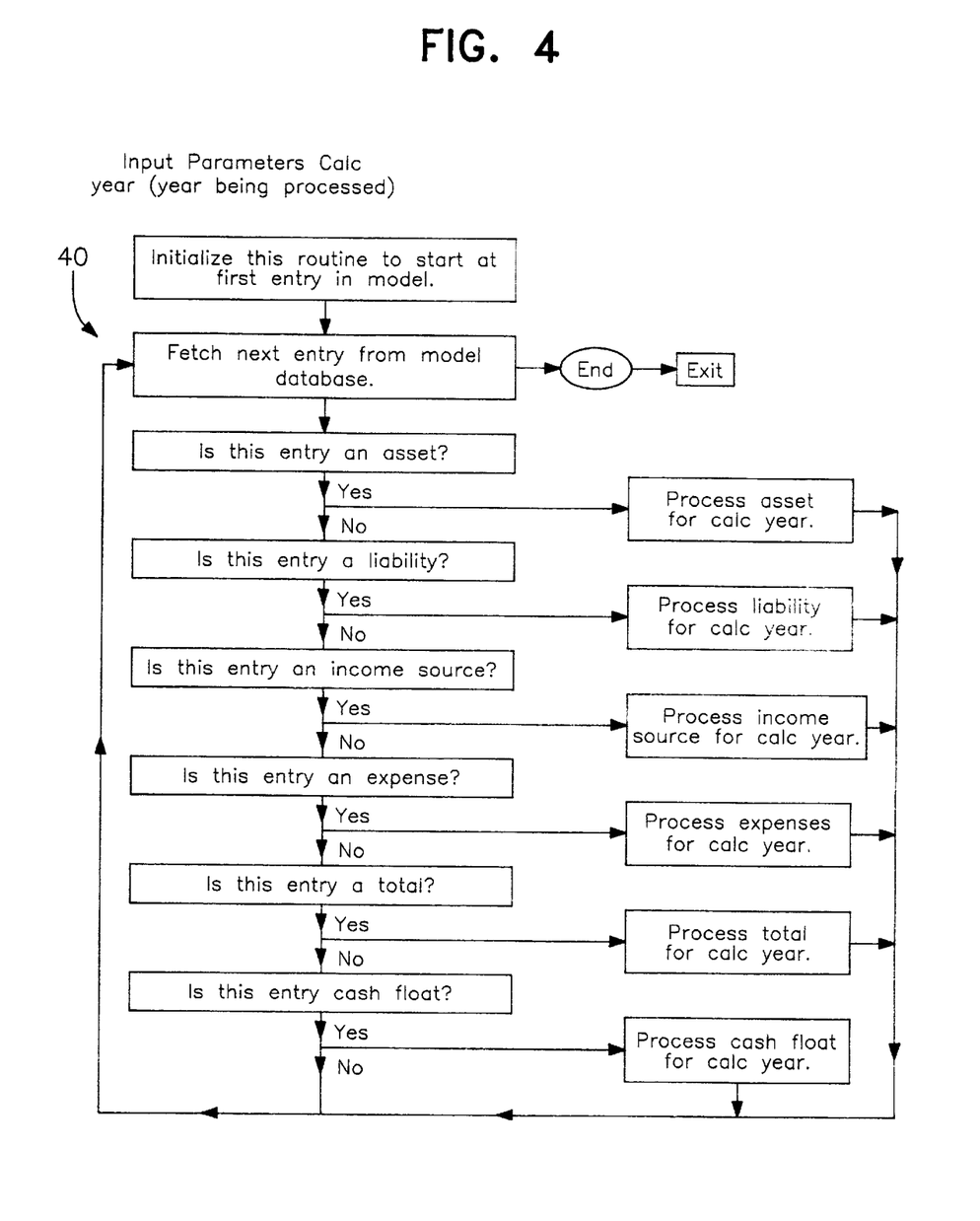
FIG. 4 is a more detailed flowchart of the block "Process one year through model" in FIG. 3.

The following are brief descriptions of the information carried in the model database for each type of entry and of the types of processing performed on each. The processes are shown graphically in the flow charts of FIGS. 3 and 4. The process in FIG. 3 for processing one year through the model 40 is shown in greater detail in FIG. 4.

Asset

Database Information

Line number.

Type of asset eg. shares, fixed property, personal asset like a car, etc.

Description of asset.

Value in base (starting) year.

Anticipated annual growth or depreciation percentage. This is negative in the case of a depreciating asset. One entry per year being planned.

Date of purchase. This is the date on which the subject intends to purchase the asset if he does not already own it in the base year.
"RET"=Retirement date.
"DEA"=Estimated date of death.

Liquidation percentage. This shows the percentage of the asset value to be liquidated in the year of sale.

Date of sale. This is the date on which the subject intends to sell or liquidate the asset. In the case of an item such as an insurance policy that is paid out in cash in its year of maturity this would be that year.
"RET"=Retirement date.
"DEA"=Estimated date of death.

Link pointers to related liability, if any.

Link pointers to related income sources, if any.

Link pointers to related expenses, if any.

Price escalation rate percent until date of purchase. One entry per year being planned.
This would be used, for example, if the intention were to purchase a motor car in the future. The value is entered as the price of the car in the base year. The model escalates the price by this percentage each year until the year of purchase is reached. In that year the investment is made at the escalated price and depreciation starts immediately using the Growth/Depreciation percentage.

Escalated purchase price. When it is planned to purchase the item in the future this is the value in the base year escalated by the price escalation rate percent for each year up to the year of purchase.

Opening asset value. One entry per year being planned.

Amount invested. One entry per year being planned.

Amount liquidated. One entry per year being planned.

Growth or depreciation amount. One entry per year being planned.

Closing asset value. One entry per year being planned.

Other types of assets may require more or less information than is shown above. For example, a retirement annuity policy needs the percentage of its value to be taken as a lump sum on maturity and the percentage to be taken annually as a pension to be indicated. Some assets such as motor vehicles require both a market value for cash flow projection and a cost value for tax calculations.

There are various other essential pieces of modelling information relating to an asset. Again, the actual items of information required depend on the type of asset.

Some examples of these are income items from the asset such as rental, dividends, interest; others are expenses such as maintenance costs, and others are liabilities such as loans (bonded or otherwise). These may be carried in their respective sections of the model (Normal taxable income, Dividend income, etc), and linked to the asset because the purchase or sale of the asset can control their applicability or else they may be carried together with the asset to facilitate checking and auditing. In this case, the entries and totals requiring these figures will fetch them as needed.

Method of Processing

If the asset has not yet been purchased in the Base year, its expected purchase price is escalated each year at the price escalation rate until the purchase year is reached. In that year the escalated purchase price is added to the amount invested in the asset.

For each year that the asset is owned, its closing balance is brought forward from the previous year. The new closing balance for the year being processed is calculated as Brought forward balance plus amount invested during year minus amount liquidated during year plus growth amount. Growth amount is calculated at the growth rate percent for the year. In the case of a depreciating asset the growth percentages are negative numbers. When calculating growth amount, amounts invested or liquidated during the year are normally treated as though they occurred half way through the year unless they are specifically dated.

In the year in which the asset is to be sold or liquidated, the liquidation percentage is applied to the asset value and that amount is put into the amount liquidated for the year.

In addition to the above, actual amounts to be invested or liquidated may be entered on the asset for any year.

For cashflow calculations, amounts invested during a year are treated as cash outflow while amounts liquidated are cash inflow.

Liability
  Database Information
  Line Number.
  Type of liability. eg. Bond on property, Bank overdraft, etc.
  Description of liability.
  Value in base (Starting) year.
  Interest payable (rate %). One entry per year being planned.
  Start date. Date on which liability will begin if not already there in base year and if not linked to an asset or if not same as date of purchase of linked asset.
    "ASS"=Date of purchase of linked asset.
    "RET"=Retirement date.
    "DEA"=Estimated date of death.
  End date. Date on which liability must be settled.
    "ASS"=Date of sale of linked asset.
    "RET"=Retirement date.
    "DEA"=Estimated date of death.
  Annual repayment amount. This may be calculated by the model or entered by the user depending on the details of the liability.
  Link pointer to related asset, if any.
  Link pointers to related income items, if any.
  Link pointers to related expenses, if any.
  Value escalation rate percent until date of incurrence. One entry per year being planned.
  Opening liability amount. One entry per year being planned.
  Amount increased. One entry per year being planned.
  Amount decreased. One entry per year being planned.
  Interest amount. One entry per year being planned.
  Repayment amount. One entry per year being planned.
  Closing liability amount. One entry per year being planned.

Method of Processing

If the liability has not yet been incurred in the Base year, its value in the Base year and its repayment amount are escalated at the value escalation rate for each year until the date of incurrence. That date may be the start date shown on the liability or it could be the date of purchase of a linked asset. For the year in which the liability is incurred, the escalated value is put into amount increased on the liability and the escalated repayment amount becomes the annual repayment.

As each year is processed, the closing liability amount is brought forward from the previous year to become the opening liability amount. The repayment amount is also copied from the previous year unless a different figure has been specified or calculated for the year being processed. Interest is calculated at the rate for the year. The closing liability amount for the year is calculated as opening liability amount, plus amount increased and interest amount, minus amount decreased and repayment amount.

In the year in which the liability has to be settled, the liability amount is put into the repayment amount after raising half a year's interest. The date of settlement may be the date of sale of the corresponding asset where the liability is linked to an asset.

Apart from the above automatic calculations, any amount may be entered into amount increased or amount decreased in any year. For the purpose of calculating cashflow for the year, amount increased is part of cash inflow while amount decreased and repayment amount form part of cash outflow. On certain types of liabilities (eg. loans, bonds and hire purchase agreements) the rates, data requirements and processing may vary greatly from one to the next as there are numerous variations in the conditions pertaining to loans of different types.

Expense or Cash Outflow Item
  Database Information
  Line number.
  Type of expense, eg. medical, entertainment, holiday, insurance, etc.
  Description of expense.
  Amount in base year.
  Anticipated annual growth rate. (Negative for a reducing amount). One entry per year being planned.
  Expense percentage. If the expense amount is calculated as a percentage of the value of the linked asset or liability or income item then this is that percentage.
  Start date. Date on which expense will begin if not already there in base year and if not linked to an asset or liability or an income item or if not same as date of purchase of linked asset or date of incurring of linked liability or start date of linked income item.

"ASS"=Date of purchase of linked asset.
"RET"=Retirement date.
"LIA"=Date of incurring of liability.
"INC"=Start date of linked income item.
"DEA"=Estimated date of death.

End Date. Date on which expense will end if not linked to an asset or a liability or an income item or if not same as disposal date of linked asset or date of settlement of linked liability or end date of linked income item.
"ASS"=Date of disposal of linked asset.
"RET"=Retirement date.
"LIA"=Date of settlement of linked liability.
"INC"=End date of linked income item.
"DEA"=Estimated date of death.

Link pointer to related asset or liability, if any.

Link pointer to related income item, if any.

Amount of expense. One entry per year being planned.

Method of Processing

The amount of the expense may be carried as an actual amount in the Base year or as a percentage of the value of a linked asset, liability or income item. In addition, certain types of expense may require formulae and/or tables of figures for their calculation. If it is an amount and it has not yet been incurred in the Base year it is escalated at the growth rate for each year until its first date of incurrence. If the expense is linked to an asset then that date may be the date of purchase of the asset. If it is linked to a liability it may be the date of incurring of the liability. Otherwise, if it is linked to an income item it may be the start date of the income item. In the first year of incurrence the escalated amount is reflected as an expense (cash outflow) for the first time. Each year henceforth the amount is escalated by the growth factor for the year. Of course, if the amount is calculated by applying a formula or a percentage to another figure or combination of figures in the model then the growth factor may not apply.

The expense continues until its end date which again may be dependent on a linked asset, liability or income item.

The expense amount may also just be specified as an amount for each year with or without a growth rate. In that case start and end dates override these amounts.

Income Source
  Database Information
  Line number.
  Type of income source eg. Salary, Dividends, etc.
  Description of income source
  Amount in base year
  Anticipated Annual growth rate. (Negative for a reducing amount.) One entry per year being planned.
  Income percentage. If the income amount is a percentage of the value of the linked asset or liability then this is that percentage.
  Start date. Date on which income will begin if not already there in base year and if not linked to an asset or a liability or if not same as date of purchase of linked asset or date of incurring of linked liability.
    "ASS"=Date of purchase of linked asset.
    "RET"=Retirement date.
    "LIA"=Date of incurring of linked liability.
    "DEA"=Estimated date of death.
  End date. Date on which income will end if not linked to an asset or a liability or if not same as disposal date of linked asset or settlement date of linked liability.
    "ASS"=Date of disposal of linked asset.
    "RET"=Retirement date.
    "LIA"=Date of settlement of linked liability.
    "DEA"=Estimated date of death.
  Link pointer to related asset or liability, if any.
  Income amount. One entry per year being planned.
Method of Processing The income amount may be carried as an actual amount in the base year or as a percentage of the value of a linked asset or liability. In addition, certain types of income may require formulae and/or tables of figures for their calculation. If it is an amount and it has not yet started to flow in the Base Year it is escalated at the growth rate for each year until the start date. If the income is linked to an asset then that date may be the date of purchase of the asset otherwise if it is linked to a liability it may be the date of incurrence of the liability. In the start year the escalated amount is reflected as income for the first time. Each year henceforth the amount is escalated by the annual growth rate for the year. If the amount is calculated by applying a formula or a percentage to another figure or combination of figures in the model then the growth factor may not apply.

The income continues until its end date which again may be dependent on a linked asset or liability.

The income amount may also just be specified as an amount for each year with or without a growth rate. In this case start and end dates override these amounts. For cash-flow calculations, income is, of course, treated as cash inflow.

Total or Sub-Total
  Database Information
  Line number
  Total type
  Total description
  Total amount. One entry per year being planned.
Method of Processing Each total in the model has a unique method to find and process the figures it needs. This is best explained by examples.

a) To calculate total income tax for the year, the total entry formula locates the information it needs in the various parts of the model. It knows the entry types required and the areas in the model in which they reside. It then does whatever calculations are necessary to calculate tax according to the tax laws prevailing in the year being processed.
  b) To calculate nett cashflow for the year, the formula for that entry locates every cash inflow and cash outflow item and sums them.
  c) Total nett assets for the year is arrived at by summing the carried forward balances for the year being processed on all assets and liabilities.

Section Heading
  Database Information
  Line number.
  Type of entry. ie. Section heading.
  Section heading in words.
Method of Processing No processing is performed on Section headings by the Model calculation programs.

Cash Float
  Database Information
  Line number.
  Type of entry. ie. Cash Float.
  Description, "CASH FLOAT".
  Surplus interest rate percent. This is the annual rate of interest earned on a positive amount. One entry per year being planned.

Deficit interest rate percent. This is the annual rate of interest charged on a negative amount. One entry per year being planned.

Brought forward balance. One entry per year being planned.

Surplus for year. One entry per year being planned.

Interest on surplus for year. One entry per year being planned.

Deficit for year. One entry per year being planned.

Interest on deficit for year. One entry per year being planned.

Carried forward balance One entry per year being planned.

Method of Processing

For the year being processed the following methods are applied:

The balance is brought forward from the previous year.

Interest is calculated in two parts:

Half a year's interest is calculated on the brought forward balance using either the surplus or deficit interest percentage for the year depending on whether the balance is positive or negative.

The balance and either the surplus or deficit for the year (depending on which one is present) are then summed together and a further half year's interest is calculated on their total.

Again, the interest percentage used depends on whether the total is positive or negative. The two calculated interest amounts are totalled. If the total is positive it is put into interest on surplus for the year, otherwise into interest on deficit. The carried forward balance for the year is then calculated as the sum of the brought forward balance, surplus for the year and the interest on it and the deficit for the year and the interest on it.

For cashflow calculations the interest on deficit is included in cash outflow for the year while the interest on surplus forms part of the cash inflow.

The detailed and comprehensive structure of the models described above already provides highly useful information to the subject when projected forward. However, because of the complexity involved in attempting to determine the effect of different choices, rules and other variables on the projected financial situation, the invention further provides applied to the unplanned future financial situation 18 of the subject so that he or she can be satisfied that the rules and preferences originally entered when creating 14 the planning rules database 16 are suitable, or alternatively, so that the necessary adjustments to the planned future financial situation 20 can be made.

Figure 5A:
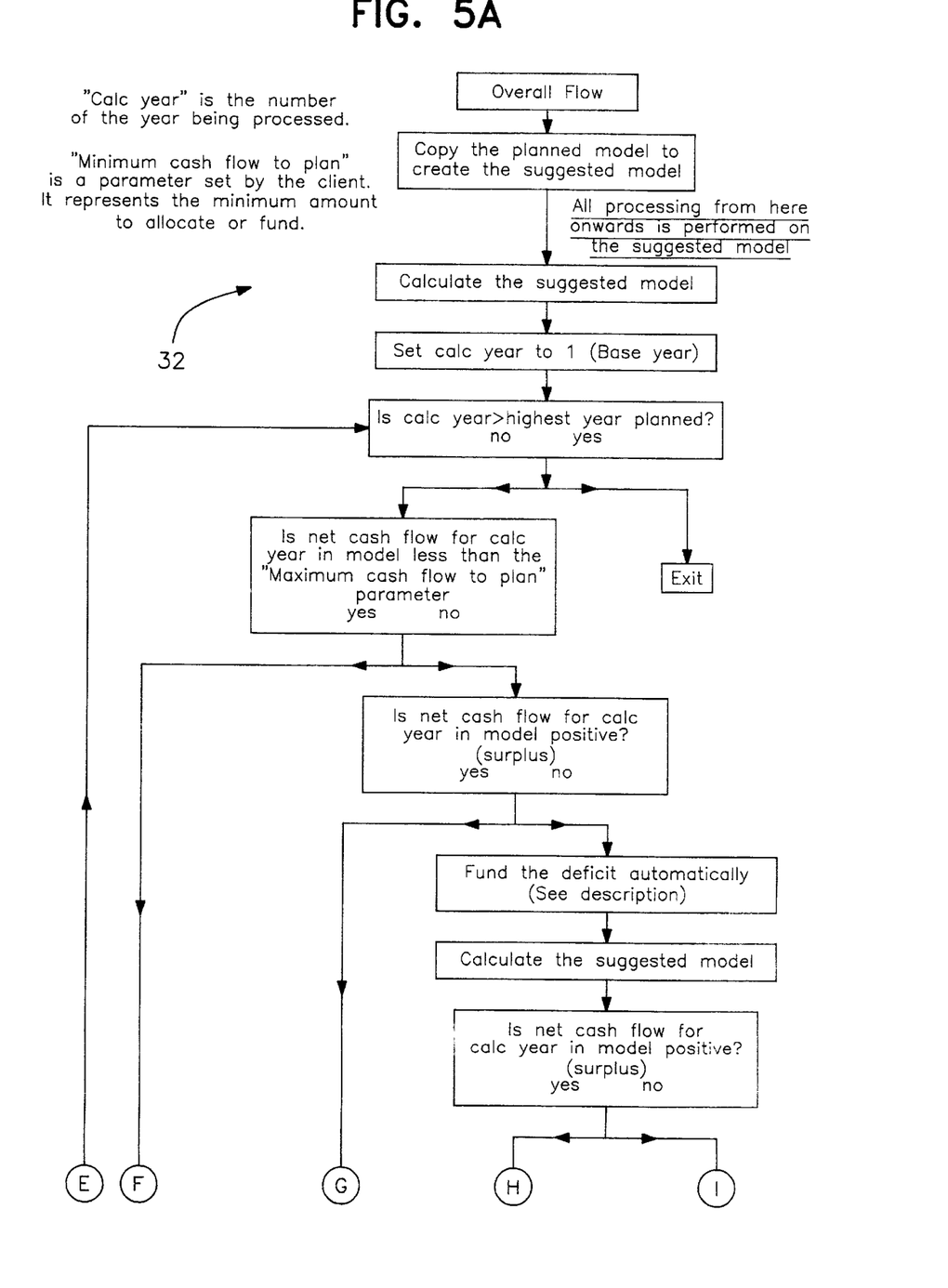
FIG. 5 is a simplified flowchart of an automatic allocation and funding program utilized in the method of the invention.
Figure 5B:
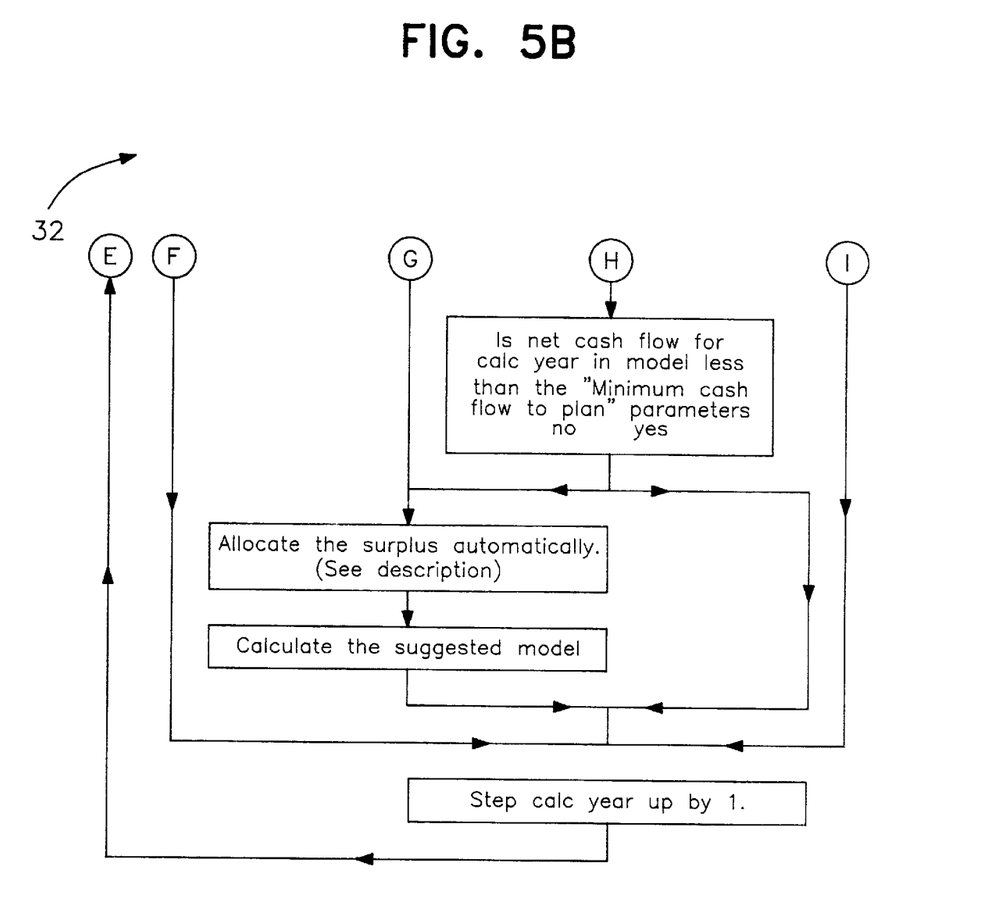

A planning program or routine 38 is provided which allows the subject to view the data in the three model databases, to make changes to the planned model database, inter alia by transferring figures from the suggested model database to the planned model database, and, in particular, to run the automatic allocation and funding program, shown in greater detail in FIG. 5, when required.

Once the user is satisfied that the basic model has been correctly built, a routine is run to create the planned model 26, which starts off as a copy of the basic model 22 and which is subsequently updated.

The subject will typically start by examining a financial summary and various graphs generated by the model and displayed on the computer's VDU, allowing the projected financial situation to be accessed. The user can make changes to the entries in the planned model and recalculate the model to see the effect thereof. The user can access any entry in the planned model. A multi-level index is provided to enable any item to be accessed via main section headings, section headings and sub-sections. The financial summary screen can be presented in a "merged" or "non-merged" format, depending on which is easier to interpret.

In addition to the making of manual changes to the planned model, the subject can run the automatic allocation and funding program 32 whenever the need is felt for a suggested future projection 30 based on the data in the planning rules database 16. A number of different planned future projections can be created for comparison.

The automatic allocation and funding program 32 utilises data entered by the subject relating to the allocation of surpluses and the funding of deficits. A format for setting surplus allocation parameters is shown in Table I. For each item to which future surpluses may be allocated an entry reflecting the subject's preferences is filled in on the screen for surplus allocation parameters of table I which is used to build a surplus allocation table (see Appendix 2). This surplus allocation table forms part of the planning rules database 16.

TABLE I

Surplus Allocation Parameters

| Description of Asset or Liability | Type (A)sset (L)iability | Line Number in model | Sequence No. (Priority) 1 = Highest | Y or N | | Minimum number of years to invest | Maximum amount to invest | Minimum amount to invest | Maximum % of surplus to invest | Final year in which to invest |
|---|---|---|---|---|---|---|---|---|---|---|
| | | | | Use if balance negative | Use if balance positive | | | | | |
| | | | | | | | | | | |
| | | | | | | | | | | |
| | | | | | | | | | | | for an automatic allocation and funding program 32 to operate on the model, thereby to illustrate to the subject the effect of his or her chosen strategy and choices. As shown in FIG. 1, this routine operates automatically, using the data entered originally into the planning rules database 16, and allows a complex sequence of priorities and choices to be Similarly, a format for deficit funding preferences is shown in Tables II and III. Deficit funding parameters for liabilities and assests are entered into the screens of Tables II and III respectively, according to the parameters set out in Appendices 3 and 4, respectively, and utilised as a deficit funding table in the planning rules database.

TABLE II

Deficit Funding Parameters - Liablilities

| Description of Liability | Sequence No. (Priority) 1 = Highest | Line Number in model | Line Number of linked asset | Link type | Funding value % | Funding Controller | Maximum amount to raise on this item | Minimum amount to fund from here |
|---|---|---|---|---|---|---|---|---|
|  |  |  |  |  |  |  |  |  |
|  |  |  |  |  |  |  |  |  |
|  |  |  |  |  |  |  |  |  |

- Link type: A = If linked asset is liquidated then this item must be settled.
- Funding value %: Percentage of value of linked asset that can be raised on this item.
- Funding Controller: A = Never fund deficits from this item automatically.

TABLE III

Deficit Funding Parameters - Assets

| Description of Asset | Sequence No. (Priority) 1 = Highest | Line Number in model | Line Number of linked liability | Link type | Maximum % of value that may be liquidated | Liquidation controller | Maximum amount to liquidate | Minimum amount to fund from here | Earliest year to liquidate | Partial liquidation allowed (Y/N) |
|---|---|---|---|---|---|---|---|---|---|---|
|  |  |  |  |  |  |  |  |  |  |  |
|  |  |  |  |  |  |  |  |  |  |  |
|  |  |  |  |  |  |  |  |  |  |  |

- Link type: A = If this item is liquidated then its linked liability must be settled.
- Liquidation controller: A = Never liquidate this item automatically. B = If a surplus arises in the future do not liquidate this item automatically.

A deficit funding routine is utilised to build up a deficit funding array (Appendix 5) from the data in the deficit funding table prior to the calculation of each year's data in the automatic allocation and funding program.

The program reads through the entries in the Deficit funding table in the planning rules database. For each table entry whose parameters allow it to be used to fund a deficit automatically in the Calc year (the year being worked on), it sets up an entry in the deficit funding array. Each entry in the array shows the amount of money available for deficit funding in the year being worked on, this being dependent on the subject's rules and perhaps, the value of the asset or liability in that year. (See layout of Deficit finding array entry—appendix 5). The entries are placed in the array in the most useful sequence. Refer to the layouts of the asset and liability entries in the deficit funding table (Appendix 3 and Appendix 4) to see the parameters that limit the use of an item for automatic funding in a year.

On each entry the amount that can be raised in the Calc year is computed in the following way:

For a liability the program selects the lesser of the "Maximum amount to be funded from this item" in the table or the "Funding value percentage" of the brought forward value of the linked asset for the Calc year in the suggested model. From the selected amount it subtracts the "Opening liability amount" for the Calc year on the item in the suggested model.

For an asset the lesser amount is selected between the "Maximum amount to be liquidated from this asset" in the table and the "Maximum liquidation value percentage" of the brought forward value of the asset for the Calc year in the suggested model. If there is a liability linked to the asset and it has to be settled when the asset is liquidated then the opening liability amount for the Calc year on the linked item in the suggested model is subtracted from the selected amount.

When the array has been built, its entries are sequenced on Sequence number, type (assets then liabilities) and Amount that can be raised in Calc year.

Apart from the funding rules set by the subject, another factor considered by the program is the future pattern of expected surpluses and deficits. When a deficit is found in a year the future cashflow can follow three basic courses, possibly requiring different funding strategies. These are referred to in the program as patterns 1, 2 and 3.

In pattern 1, the deficit year being worked on may be followed by one or more further deficit years but these are followed by surplus years for the rest of the period being planned. In this case the program tries to fund from liabilities without touching assets but will use assets where necessary.

In future pattern 2 there will be a mixture of deficit and surplus years in the future.

In future pattern 3 there are continuous deficits until the last year being planned.

For patterns 2 and 3 the program funds from assets and liabilities in the sequence specified by the user.

The entries in the deficit finding array are accessed in sequence when trying to fund a deficit. Because of the way in which the entries are sequenced the program handles them firstly in the preferred sequence set by the subject and secondly in ascending value so that the assets with the lowest possible values will be liquidated.

A situation can arise where despite one or more smaller assets being liquidated it still becomes necessary to entirely liquidate a large item which in itself is sufficient to cover the deficit for the year. In this case the program does not liquidate the smaller items but just uses the large one.

If an asset is liquidated and it has a linked liability, the liability is settled automatically. If a liquidated asset or a settled liability has income or expense items linked to it those items are ended automatically in the same year. Likewise, where a liability is incurred for the first time, any linked income or expense items are started up automatically.

When the program liquidates an asset partially or completely it adds the liquidated amount to the "Amount liquidated" for Calc year on the item in the suggested model. To raise money on a liability it adds the amount to "Amount increased" for the Calc year on the liability in the suggested model.

The automatic allocation and funding program allocates a cashflow surplus according to the parameters set in the planning rules database. Each entry in the surplus allocation table is examined in turn, in the sequence specified by the subject. On each one, the decision parameters are considered to see whether or not any of the surplus for the Calc year can be allocated to the item. In considering the minimum period of investment, the program looks ahead at the projected cashflow in future years to see the timing and magnitude of any anticipated deficits. Working with the decision parameters, the amount of the surplus and the amount already invested in the item as shown in the suggested model, the program calculates the amount to be allocated to the item. If the item is an asset, the amount is added to its "Amount invested" for the calc year in the suggested model. On a liability, the allocated amount is added to the "Amount decreased" for the Calc year. The program carries on processing entries from the surplus allocation table until either the surplus is completely allocated or the table is exhausted.

Event Reporting

Cashflow

The cashflow related to any particular asset, liability, expense item or source of income can be of two types, continuous or intermittent. On-off cashflow items may be considered as intermittent for the purpose of this explanation.

Some examples of the different types of cashflow on a fixed property are:

Continuous cashflow items:
 Rates and taxes
 Repairs and maintenance
 Domestic staff salaries etc.
 Insurance
 Lights and water
 Rental income Intermittent cashflow items:
 Purchase price and other charges on purchase of property
 Cost of major renovations to property
 Cost of major improvements to property
 Income from sale of property Events "Events" related to an asset, liability, expense item or source of income are occurrences or actions that result in a significant change in the continuous cashflow or that result in intermittent cashflow via the item.

The events relating to a fixed property would be:
 The purchase of the property
 The sale of the property
 Major renovations
 Major improvements
 The beginning or end of any expense or type of income
 A significant change to the amount of any expense
 A significant change to the amount of any type of income Different types of items have different events. For example, in the case of a loan the events may be:
 The raising of the loan
 The settlement of the loan
 The borrowing of additional amounts on the loan
 The payment of significant additional amounts off the loan from time to time ie. amounts in excess of the required instalment.

Event Messages

By examining the information contained in the model after performing projection calculations, the Event Reporting programme identifies every significant event occurring on every entry in the model.

The programme generates a "Normal language" event message to report each event that has a meaningful effect on the subject's cashflow, assets or liabilities.

Examples of messages are:
 Client purchases fixed property "23 Johnson Ave" for R450000 on 23/11/2002.
 Client raises first mortgage bond of R300000 on fixed property "23 Johnson Ave" on 23/11/2002. Bond to be settled by 30/11/2022.
 Client begins to earn rental of R48000 per annum from fixed property "23 Johnson Ave" on 1/5/2003.
 Client donates R250000 to spouse.

The generated "Event messages" are used in various ways to produce different types of reports. One example of such a report is the "Annual Events and Actions" report. This report may be run on any of the models (unplanned, suggested, planned). It shows, year by year, the events that occur in each year. The report makes it easy for anyone to understand a plan, to compare it to other plans and to decide whether or not a plan is acceptable. For example the plan may indicate that the subject should sell his house and buy a smaller property in a certain year. On this report the subject will clearly see the implications thereof.

It will be appreciated that the described method, implemented with the assistance of a sophisticated software program, allows a highly detailed analysis and projection of a subject's financial situation, with the subject's own rules and preferences being applied automatically in projecting a suggested future financial situation year by year, thereby greatly simplifying what would otherwise be an unwieldy, complex and very laborious task. The result is that a more thorough, detailed and in-depth assessment of the subject's future financial position can be carried out in a reasonable time, with consequent benefits to the subject. In particular, the method permits the simultaneous examination of various alternative choices and the financial consequences thereof.

Examples of sections within the model and the types of items which appear within those sections

| Section names | Types of items |
| --- | --- |
| KNOWN CASH INFLOWS: | |
| Income From Employment | |
| Retirement Funding (R/F) Income | Salary, Wages, Bonus |
| Non-Retirement Funding (Non-R/F) Income | Leave pay, Commission |
| Tax-Free Income | Transfer allowance |
| Fringe Benefits | Company car |
| | Low interest loans |
| Pensions/Annuities | From Growth/Income Plans: |
| | From Pension/Provident Funds & RA's |
| Lump Sums Received From | |
| Resignations/Retirement/ Redundancy | Pension Fund (up to ⅓) |
| | Provident Fund |
| | Retirement Annuities (up to ⅓) |
| | Deferred compensation |
| | Gratuity |
| | Accumulated leave pay |
| Interest Income | Unit Trusts/Managed Share Portfolio |
| | Short Term Deposits |
| Dividend Income | Unit Trusts |
| | Building Society |
| Rental Income | Residential |
| | Timeshare |
| Business/Professional Income | Consulting fees |
| | Sales |
| Foreign Income | Investments |
| Capital Income | Fixed Assets |
| | Sale of Unit Trusts, Equities |
| Exempt Income | Interest (max. R2000) |
| | Dividends |
| Gross Contributions Made | Pension funds, RA's |
| Tax Allowable Deductions | Pension funds, RA's |
| | Car allowance, Entertainment, Medical |
| Less: | |
| Tax Paid | Tax on: Salary, Growth & Income plans |
| ANTICIPATED CASH INFLOWS: | |
| Expected future income | Inheritances, Donations |

Appendix 2
Entry in Surplus Allocation Table
Item code
Type
  A=Asset
  L=Liability
Description
Sequence number (Priority number)
  Shows the position of this item in the sequence in which surpluses must be applied to the table entries.
Line number of this item in the model.
Decision parameters
  Only if balance is negative (Y or N)
  Only if balance is positive (Y or N)
  Minimum period of investment (Asset only)
    (If zero then no minimum period)
  Maximum amount to invest (Asset only. If zero then no limit)
  Allocation percentage
    (Percentage of surplus to put into this item. If zero, then no limit)
  Minimum amount required (Asset only. If zero then no minimum)
  Maximum year number (Assets only. Do not invest in this item after this year. If zero then no maximum year)

Appendix 3
Deficit Funding Table Entry—Liability
Description of liability
Sequence no.
  This positions the item in the preferred sequence in which the items may be used for deficit funding. More than one item may have the same sequence number.
Line number of this item in the model
Line number of linked asset
Link type
  A=If linked asset is liquidated then this item must be settled.
Funding value %
  Percentage of value of linked asset that can be raised
  Zero=Not applicable
Funding controller
  A=Never fund from this item automatically
Maximum amount to be funded from this item
Minimum amount to fund from this item Appendix 4
Deficit Funding Table Entry—Asset
Description of asset
Sequence no.
  This positions the item in the preferred sequence in which the items may be used for deficit funding. More than one item may have the same sequence number.
Line number of this item in the model
Line number of linked liability
Link type
  A=If this item is liquidated then its linked liability must be settled. This can only apply to assets that cannot be partially liquidated.
Maximum liquidation value %
  Percentage of the value of this asset that can be liquidated
  Zero=Not applicable
Liquidation controller
  A=Never liquidate this item automatically eq. Pension, favoured assets. etc.
  B=If a surplus arises in the future do not liquidate this item automatically.
Maximum amount to be liquidated from this asset
Minimum amount of deficit to fund from this item.
  Zero=Not applicable Minimum liquidation year
 Zero=This item may be liquidated in any year
 Anynumber=First year in which this item may be liquidated
Partial liquidation Y or N
 Y=This item can be partially liquidated.

Appendix 5

Deficit Funding Array
Description of item
Amount that can be raised on this item in Calc year.
Sequence number
Type (Asset or liability)
 A=Asset
 L=Liability
Line number of this item in the model
Line number of linked asset or liability
Link type
 A=If this item is liquidated then its linked liability must be settled
Funding controller
 A=Never fund a deficit from this item automatically
 B=If a surplus arises in the future do not fund a deficit from this item automatically
Minimum amount of deficit to fund from this item.
 Zero=Not applicable
Partial liquidation Y or N
 Y=This item may be partially liquidated sequence of table entries:
 Ascending sequence number
 Liabilities and then assets
 Ascending amount that can be raised

We claim:

1. A method of financial planning comprising:
 creating a financial model from data relating to income, expenses, assets and liabilities of a subject;
 creating a planning rules database from data relating to a preferred financial strategy of the subject;
 projecting an unplanned future financial situation of the subject by applying predicted future circumstances to the data of the financial model;
 applying a plurality of planning rules derived from the planning rules database to data representing the subject's unplanned future financial situation, thereby to calculate a planned future financial situation; and
 generating displays of data representing the planned and unplanned future financial situations for comparison.

2. A method according to claim 1 wherein, in addition, the financial model includes similar information for the subject's spouse, family trusts or any other person or entity.

3. A method according to claim 1 wherein the planning rules derived from the planning rules database are applied automatically to the data representing the client's unplanned future financial situation by an allocation and funding routine, thereby to generate a suggested future financial situation usable in calculating the subject's planned future financial situation.

4. A method according to claim 1 which includes, on an iterative basis, selectively altering data representing the subject's planned future financial situation and recalculating the planned future financial situation by applying the planning rules to the altered data.

5. A method according to claim 1 which is carried out using a computer which generates the financial model and the planning rules database and applies the planning rules automatically to the relevant data after entry of the data.

6. A method according to claim 1 including defining at least one event relating to each of a plurality of income items, expense items, assets and liabilities affecting the cash flow of the subject, and generating a user-discernable message relating to any such event corresponding to data from which the financial model is compiled.

7. A method according to claim 6 including generating a report containing the user-discernable message or messages.

8. A method according to claim 1 wherein, for purposes of projecting the subject's future financial situation, the financial model is further compiled from data relating to applicable tax rates, estate duty rates, annual inflation rates, rates of appreciation or depreciation/increase or decrease of assets, liabilities, income and expenditure, and predicted future values thereof.

9. A method according to claim 8 wherein the financial model additionally includes data relating to costs associated with the management of assets and liabilities, including commissions, finance charges, administration fees and transfer costs.

10. A method according to claim 9 wherein the financial model further includes the subject's actual or anticipated retirement date, and estimated date of death.

11. A method according to claim 1 wherein the planning rules database is compiled by recording data corresponding to the subject's preferences relating to the investment of cash surpluses and the funding of cash deficits.

12. A method according to claim 11 wherein the planning rules database further includes data relating to predicted future income and expenses of the subject.

13. A method according to claim 12 wherein the data relates to priorities set by the subject for allocating cash surpluses to liquidate debts or fund investments, and liquidating assets or increasing liabilities to fund cash deficits.

* * * * *